United States Patent [19]
Chang et al.

[11] Patent Number: 6,013,172
[45] Date of Patent: Jan. 11, 2000

[54] METHODOLOGY FOR EXTRACTING LOCAL CONSTANTS FROM PETROLEUM CRACKING FLOWS

[75] Inventors: Shen-Lin Chang, Woodridge; Steven A. Lottes, Naperville, both of Ill.; Chenn Q. Zhou, Munster, Ind.

[73] Assignee: The University of Chicago, Chicago, Ill.

[21] Appl. No.: 08/970,024

[22] Filed: Nov. 13, 1997

[51] Int. Cl.$^7$ .................................................. C10G 11/00
[52] U.S. Cl. .................... 208/113; 208/164; 208/DIG. 1; 364/578; 364/528.01; 364/528.07
[58] Field of Search ............................... 208/113, DIG. 1, 208/164; 364/578, 528.01, 528.07

[56] References Cited

U.S. PATENT DOCUMENTS

| | | | |
|---|---|---|---|
| 3,175,968 | 3/1965 | Berger | 208/164 |
| 3,828,171 | 8/1974 | Griffin | 364/528.08 |
| 3,960,707 | 6/1976 | Gross et al. | 208/113 |
| 4,332,590 | 6/1982 | Smith | 364/500 |
| 4,437,977 | 3/1984 | Funk | 208/113 |
| 5,774,381 | 6/1998 | Meier | 364/578 |

OTHER PUBLICATIONS

Manuscript entitled "A Sectional Coupling Approach for the Simulation of Multi–Phase Reacting Flow in A Bent Reactor," written by S.L. Chang, C.Q. Zhou, S.A. Lottes, J.X. Bouillard and M. Petrick, HTD–vol. 336, Proceedings of the ASME Heat Transfer Division, vol. 4, pp. 361–373, ASME, 1996.

"A History of FCC Process Improvement Through Technology Development and Application," written by Shen–Lin Chang, Steven A. Lottes and Chenn Q. Zhou, presented at AIChE Spring National Meeting, Mar. 28–Apr. 1, 1996, pp. 1–10 and tables.

"Evaluation of Multi–Phase Heat Transfer Droplet Evaporation in Petroleum Cracking Flows," by S.L. Chang, S.A. Lottes, C.Q. Zhou, and M. Petrick, HTD–vol. 336, Proceedings of the ASME Heat Transfer Division, vol. 4, pp. 17–27, ASME, 1996.

*Primary Examiner*—Walter D. Griffin
*Attorney, Agent, or Firm*—Emrich & Dithmar

[57] ABSTRACT

A methodology provides for the extraction of local chemical kinetic model constants for use in a reacting flow computational fluid dynamics (CFD) computer code with chemical kinetic computations to optimize the operating conditions or design of the system, including retrofit design improvements to existing systems. The coupled CFD and kinetic computer code are used in combination with data obtained from a matrix of experimental tests to extract the kinetic constants. Local fluid dynamic effects are implicitly included in the extracted local kinetic constants for each particular application system to which the methodology is applied. The extracted local kinetic model constants work well over a fairly broad range of operating conditions for specific and complex reaction sets in specific and complex reactor systems. While disclosed in terms of use in a Fluid Catalytic Cracking (FCC) riser, the inventive methodology has application in virtually any reaction set to extract constants for any particular application and reaction set formulation. The methodology includes the step of: (1) selecting the test data sets for various conditions; (2) establishing the general trend of the parametric effect on the measured product yields; (3) calculating product yields for the selected test conditions using coupled computational fluid dynamics and chemical kinetics; (4) adjusting the local kinetic constants to match calculated product yields with experimental data; and (5) validating the determined set of local kinetic constants by comparing the calculated results with experimental data from additional test runs at different operating conditions.

8 Claims, 7 Drawing Sheets

METHODOLOGY FOR EXTRACTING LOCAL CONSTANTS FROM PETROLEUM CRACKING FLOWS

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

FIELD OF THE INVENTION

This invention relates generally to a method for determining local chemical kinetic model constants (in contrast to global model constants which are less accurate) and is particularly directed to a computational methodology using coupled computational fluid dynamics (CFD) and kinetic computer codes in combination with data obtained from a matrix of experimental tests to determine the kinetic constants of a chemical reaction.

BACKGROUND OF THE INVENTION

Computational fluid dynamics (CFD) is a common approach for improving the understanding of hydrodynamics, thermodynamics, and chemical kinetics of a flow system. CFD codes have been evolving over the past 20 years with great advances in both the numerical techniques and computer hardware. CFD applications have been extended from simple laboratory-type problems to complex industrial-type flow systems. Computer simulation has gained widespread acceptance as an effective and cost-saving tool to further improve the performance of flow systems.

One CFD application is in the area of petroleum/catalyst flow in a fluidized catalytic cracking (FCC) reactor. Since the introduction of commercial-scale FCC systems in the early 1940s, the FCC process has been constantly improved and has become the primary conversion process in the modern refinery industry. In improving the process, cracking reaction time in an FCC unit has been substantially shortened and the hydrodynamic effects on cracking processes have become better understood. It has been suggested that a fundamental understanding of the hydrodynamics and heat transfer in the injection zone and riser is critical to the development of higher performance FCC units which would not only increase the competitiveness of the refinery industry, but also reduce pollutant emissions into the environment.

Various computer-implemented approaches have been developed for the purpose of improving FCC performance. One such approach has been developed at Argonne National Laboratory for simulating a three-phase (gas, liquid and solid) flow in FCC riser reactors. This computer code, referred to as ICRKFLO, uses a sectional coupling, time integral approach to handling cracking flows, including heat transfer between solid, liquid and gas; vaporization of the oil droplets; oil cracking; and coke formation. The time integral approach couples hydrodynamic and kinetic processes in a way that prevents the calculation from becoming numerically unstable. The ICRKFLO approach does not provide local kinetic model constants, as opposed to global model constants, which are necessary for computing reaction and product yields in non-uniform flow fields under a broad range of operating conditions for a reactor system. The inability of the ICRKFLO approach to provide these local kinetic model constants has precluded the consideration of the local fluid dynamic effects on the extracted local kinetic constants for each particular application system to which the methodology is applied. This has limited the capability of this approach in modeling and controlling FCC processes.

The present invention addresses the aforementioned limitations of the prior art by providing a methodology for extracting local kinetic constants for computing reaction and product yields under a broad range of operating conditions, such as for example in non-uniform flow fields in a FCC reactor system. The inventive approach implicitly includes the local fluid dynamic effects in the extracted local kinetic constants for each particular application system to which the methodology is applied.

OBJECTS AND SMARY OF INVENTION

Accordingly, it is an object of the present invention to provide a methodology for determining local kinetic model constants using local fluid dynamic effects in the analysis of chemical flow reactor systems.

It is another object of the present invention to provide an analysis approach which couples computational fluid dynamics with kinetic computations to provide local kinetic constants useful over a broad range of operating conditions for specific and complex reaction sets in specific and complex reactor systems.

A further object of the present invention is to extract local chemical kinetic model constants in a reacting flow computational fluid dynamics computer code for a reaction set and reactor system for optimizing system operating parameters and design.

This invention contemplates a methodology to extract local chemical kinetic model constants for use in a reacting flow computational fluid dynamics (CFD) computer code coupled with chemical kinetic computations. obtaining local kinetic model constants as opposed to global model constants is necessary for computing reaction and product yields in non-uniform flow fields under a broad range of operating conditions for a chemical reactor system. A key feature of the methodology is that it uses the coupled CFD and kinetic computer code in combination with data obtained from a matrix of experimental tests to extract the kinetic constants. This approach implicitly includes the local fluid dynamic effects in the extracted local kinetic constants for each particular application system to which the methodology is applied. The application of the methodology does not produce a universal set of kinetic model constants for a specified set of chemical reactions that will work well in computations for systems that are greatly different in geometry or other significant characteristics. No known method for producing such a set of constants exists, except for very simple reaction sets limited also to relatively simple reactor systems. The inventive methodology provides a means to extract local kinetic model constants that work well over a fairly broad range of operating conditions for specific and complex reaction sets in specific and complex reactor systems. Once the kinetic model constants have been extracted for a reaction set and reactor system, the model constants can be used in the coupled CFD and chemical kinetic code to optimize the operating conditions or design of the system, including planned retrofit design improvements to existing systems.

The inventive local kinetic model constant extraction methodology requires the use of a computational scheme for coupling CFD calculations with chemical kinetic calculations in a novel two stage approach that avoids numerical stiffness problems that frequently arise when CFD and chemical kinetic computations are coupled. The computer code in Which this two-stage approach was implemented and used to test the methodology is ICRKFLO 2.0 developed at Argonne National Laboratory.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DETAILED DESCRIPTION OF PREFERRED EMBODIMENT

Figure 1:
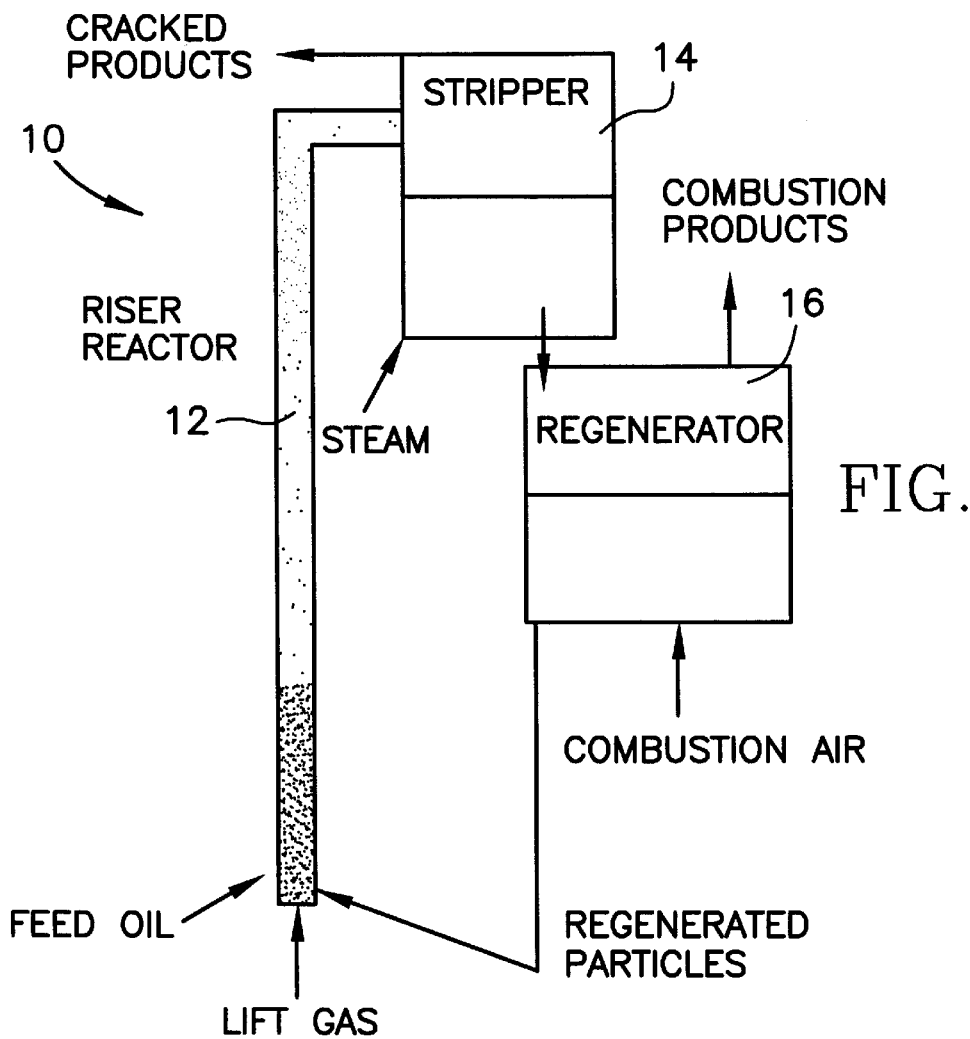
FIG. 1 is a simplified block and schematic diagram of a generalized cracker unit of the fluid catalytic cracking reactor type such as used in petroleum processing with which the methodology of the present invention may be used.

Referring to FIG. 1, there is shown a simplified schematic and block diagram of a generalized fluid catalytic cracking reactor, or thermal cracker unit, 10 which includes three major components: a riser reactor 12, a stripper 14, and a regenerator 16. Oil is fed into a lower end of the riser reactor 12, where it is mixed and heated by regenerated catalyst particles to induce vaporization and cracking. The cracking processes produce various fuel products and coke. The coke and some oil products are deposited on particle surfaces. A steam stripper 14 separates particles and oil products for further processing. The spent particles covered with coke are directed to the regenerator 16 to burn off the coke with air. The hot regenerated particles are then recycled back to the riser reactor 12. The riser reactor 12 may have a complex geometry. The oil injector arrangement of the riser 12 is three dimensional in nature and its long tube usually has bends and/or area changes (expansion or reduction). The methodology of the present invention takes into consideration the specifics of the fluid catalytic cracking reactor configuration and operating parameters to provide local kinetic reaction model constants as described in the following paragraphs.

The inventive methodology described in the following paragraphs is general. It can be applied to virtually any reaction set to extract constants for any particular reacting flow system application and is not limited to the particular embodiment of the invention described in the following paragraphs. For purposes of illustration and clarity a particular application and reaction set formulation are used to describe the methodology. The application is the Fluid Catalytic Cracking (FCC) riser, and the reaction model is kept simple because the methodology is primarily independent of the complexity of the reaction model. Consider an FCC riser simulation in which the first stage CFD computation uses a 4-lump kinetic model with two cracking reactions including (1) one that converts feed oil to light oil, dry gas, and coke; and (2) another that converts light oil to dry gas and coke. These reactions are denoted as follows:

$$P_o \xrightarrow{k_1} a_1 P_l + a_2 P_g + a_3 C_k \quad (1)$$

$$P_l \xrightarrow{k_2} b_1 P_g + b_2 C_k \quad (2)$$

where $P_o$, $P_l$, $P_g$, and $C_k$ represent feed oil, light oil, dry gas, and coke, respectively, and stoichiometric coefficients $a_1$, $a_2$, $a_3$, $b_1$ and $b_2$ are expressed in mass fractions. Reaction rates of these reactions can be expressed respectively in Arrhenius formulas as, $$k_1 = k_{0,1} \exp\left[-\left(\frac{E_1}{R}\right)\left(\frac{1}{T} - \frac{1}{T_r}\right)\right]\left(\frac{\theta_p}{\theta_{po}}\right)^{n_1} \exp(-\alpha_1 f_{ck}) \quad (3)$$

$$r = k_2/k_1 = r_0 \exp\left[-\frac{E_2}{R}\left(\frac{1}{T} - \frac{1}{T_r}\right)\right]\left(\frac{\theta_p}{\theta_{po}}\right)^{n_2} \exp(-\alpha_2 f_{ck}) \quad (4)$$

$$b_1 = b_{0,1} \exp\left[-\frac{E_3}{R}\left(\frac{1}{T} - \frac{1}{T_r}\right)\right] \quad (5)$$

which, $k_{0,1}$, $b_{0,1}$ and $r_0$ are the rate constants. $E_1$, $E_2$ and $E_3$ are the activation energies. $n_1$ and $n_2$ are the order of catalyst reactions. $\alpha_1$ and $\alpha_2$ are catalyst deactivation coefficients of the cracking reactions (1) and (2), respectively. $\theta_p$ is the catalyst volume fraction and $\theta_{po}$ is the reference catalyst volume fraction. $b_1$ is a stoichiometric coefficient, $T_r$ is the reference temperature, and $f_{ck}$ is the coke concentration. R is a gas constant for a particular gas as expressed by the universal gas constant divided by the gas mixture molecular weight, while T is the absolute temperature as measured in degrees Kelvin. Constants $k_{0,1}$, $E_1$, $n_1$, and $\alpha_1$ must be determined from a portion of the experimental data matrix and validated using another portion of the experimental data matrix.

In the second stage of the computation, reaction and flow transport are calculated for a large number chemical species or lumped chemical species. Each of these species or lumps is referred to as a subspecies. In the petroleum application used for illustration, subspecies $P_i$ cracks into lighter species $P_j$, j=2, i−1, and a by-product coke according to the following reaction:

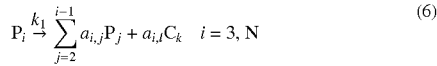

$$P_i \overset{k_1}{\rightarrow} \sum_{j=2}^{i-1} a_{i,j} P_j + a_{i,l} C_k \quad i = 3, N \quad (6)$$

The reaction rates are similar in form to the one in the 4-lump model.

$$k_i = k_{0,1} \exp\left[-\left(\frac{E_i}{R}\right)\left(\frac{1}{T} - \frac{1}{T_r}\right)\right]\left(\frac{\theta_p}{\theta_{po}}\right)^{n_i}\left(\frac{MAT}{MAT_o}\right)^{m_i} \exp(-\alpha_i f_k), i = 3, N \quad (7)$$

in which, MAT is the activity of the catalyst, $MAT_o$, is the reference activity of the catalyst, and $m_i$ is the order of the catalyst activity.

The methodology, applied to this case for modeling the effects of temperature, catalyst to oil ratio, and activity of catalyst, includes the following steps: (1) selecting test data sets for various conditions; (2) establishing the general trend of the parametric effect on the measured product yields; (3) setting up the ICRKFLO 2.0 code to calculate product yields for the selected test conditions; (4) using a multi-step iterative process, which includes CFD computation over the flow field, to adjust the local kinetic constants to match calculated product yields with experimental data; and (5) when a set of local kinetic constants are determined, validating them by comparing the calculated results with experimental data from additional test runs at different operating conditions.

Figure 2:
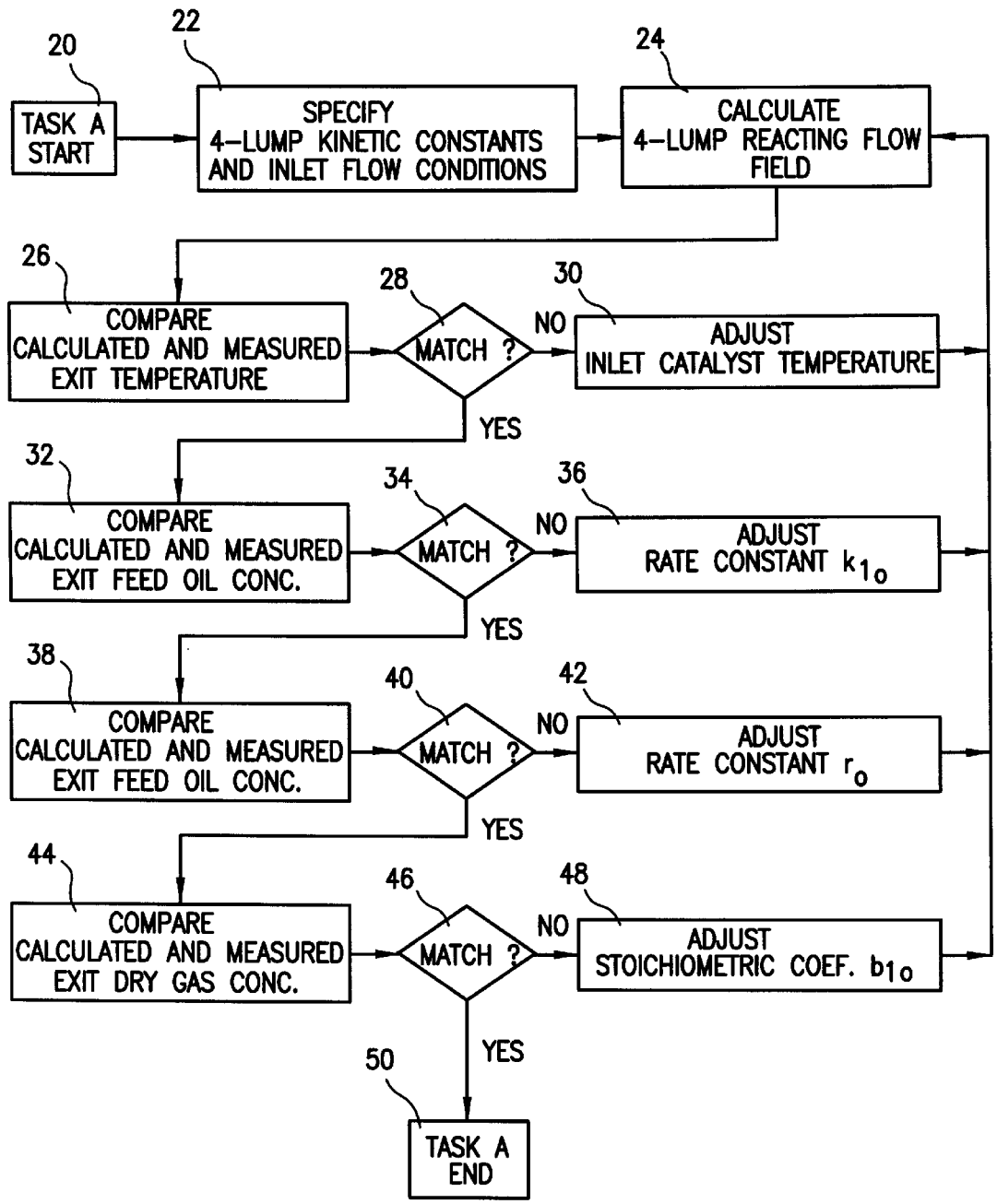
FIG. 2 is a simplified flow chart illustrating the steps involved in determining kinetic rate constants with specified activation energies from a single experimental test in accordance with one aspect of the present invention.
Figure 3:
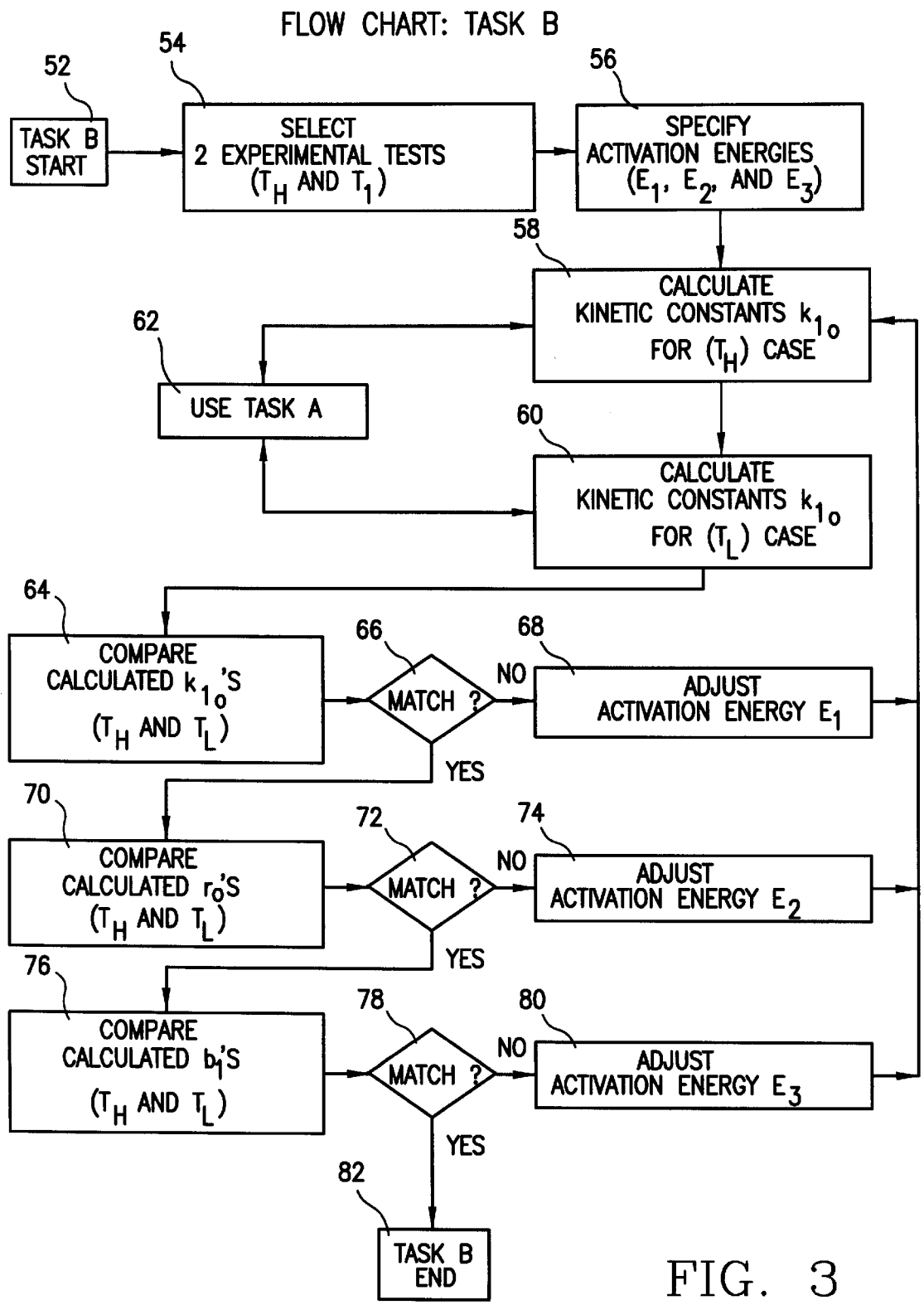
FIG. 3 is a simplified flow chart illustrating the steps involved in carrying out an iteration routine for calculating 4-lump kinetic activation energies in accordance with another aspect of the present invention.

In FCC riser flow simulations of the disclosed embodiment of the present invention, two sets of kinetic constants need be determined. One set is for the 4-lump modeling and the other set is for the subspecies modeling. For the 4-lump modeling, the iteration process for determining 4-lump kinetic constants is shown in FIGS. 2 and 3. Two tasks are included. Task A is for determining kinetic constants with specified activation energies from a single experimental test. As indicated in FIG. 2, Task A starts by using given inlet flow conditions and the current estimate of the 4-lump local kinetic constants. The 4-lump reacting flow computation is then done. Next, calculated and measured exit temperatures are compared. If they do not match, inlet catalyst temperature is adjusted until a match is obtained. Then rate constants, $k_{0,1}$, $r_o$, and $b_{0,1}$, are adjusted until calculated and measured feed oil, light oil, and dry gas concentrations at the exit match each other, respectively.

In the flow charts described in the following paragraphs, a square represents the start or end of an operation, or task; a diamond indicates a decision point; and a rectangle indicates the performance of an operation. The sequence of steps indicated in the flow charts are stored in a computer and are carried out sequentially as the computer executes various commands stored in its memory.

The iteration routine for calculating 4-lump kinetic rate constants in accordance with Task A as shown in FIG. 2 is initiated at step 20, followed by the specifying of the 4-lump kinetic constants and inlet flow conditions at step 22. The program stored in the computer then calculates the 4-lump reacting flow field at step 24, followed by a comparison of the calculated and measured exit temperatures at step 26. If there is a match between the calculated and measured exit temperatures as determined in step 28, the program proceeds to step 32 and compares the calculated and measured exit feed oil concentrations. If the calculated and measured exit temperatures do not match as determined at step 28, the program proceeds to step 30 and adjusts the inlet catalyst temperature and then proceeds to step 24 for again calculating the 4-lump reacting flow field. The program then again compares the calculated and measured exit temperatures and adjusts the inlet catalyst temperature until there is a match between the two temperatures. At step 32, a comparison is made between the calculated and measured exit feed oil concentrations, and if there is a match between these two parameters as determined at step 34, the program proceeds to step 38 for comparing the calculated and measured exit light oil concentration. If at step 34 it is determined that the calculated and measured exit feed oil concentrations do not match, the rate constant $k_{10}$ is adjusted at step 36, followed again by a calculation of the 4-lump reacting flow field at step 24. If the calculated and measured exit light oil concentrations match as determined at step 40, a comparison is then made between the calculated and measured dry gas concentrations at step 44. If at step 40 it is determined that there is not a match between the calculated and measured exit light oil concentrations, the rate constant $r_2$ is adjusted at step 42 followed by another calculation of the 4-lump reacting flow field at step 24. If there is a match between the calculated and measured exit dry gas concentrations as determined at step 46, the program exits Task A at step 50. If at step 40 it is determined that there is not a match between the calculated and measured exit dry gas concentrations, the stoichiometric coefficient $b_{0,1}$ is adjusted at step 48, followed by another calculation of the 4-lump reacting flow field at step 24. In summary, in executing the iterative routine for calculating the 4-lump kinetic rate constants as shown in FIG. 2 and described as Task A, the calculated and measured values of the exit temperature, the exit feed oil concentration, the exit light oil concentration and the exit dry gas concentration are compared and the inlet catalyst temperature, rate constant $k_{0,1}$ rate constant $r_2$ and the stoichiometric coefficient $b_{10}$ are respectively adjusted until there is a match between the calculated and measured feed oil, light oil and dry gas concentrations at the exit.

Task B shown in FIG. 3 determines local kinetic constants that include both the effects of local and global temperatures. Task B is initiated by selecting two experimental tests. One is at higher temperature $T_H$ and the other at lower temperature $T_L$. Using the current set of local activation energies ($E_1$, $E_2$ and $E_3$), kinetic constants $k_{0,1}$, $r_2$ and $b_{0,1}$ are calculated using Task A for the two selected cases respectively. Then the two $k_{0,1}$'s for the $T_H$ and $T_L$ cases are compared. If they do not match, the activation energy $E_1$ is adjusted, and new $k_{0,1}$'s are calculated based on the adjusted activation energy by using Task A again. This procedure is repeated until the two calculated $k_{0,1}$'s match and the same procedures are used for the calculations of $r_2$ and $b_{10}$ by adjusting $E_2$ and $E_3$. Task B ends when two cases ($T_H$ and $T_L$) give the same set of $k_{0,1}$, $r_o$ and $b_{0,1}$. This set of kinetic constants and activation energies is then validated by using them for predictions of other cases at different temperatures. The determination of the order of the catalyst reaction, $n_1$ and $n_2$, also requires an iteration routine, which is very similar to the one for subspecies calculation as described below.

Task B is an iteration routine for calculating the 4-lump kinetic activation energies in accordance with another aspect of the present invention. Task B is initiated at step 52, followed by the selection of two experimental tests such as one at a higher temperature $T_H$ and one at a lower temperature $T_L$ at step 54. At step 56, a set of local activation energies $E_1$, $E_2$ and $E_3$ are specified followed by calculation of the kinetic constants $k_{0,1}$, $r_2$ and $b_{0,1}$ for the $T_H$ case at step 58 and for the $T_L$ case at step 60. The procedure described above in terms of Task A is used at step 62 in Task B for calculating the aforementioned three kinetic constants. A comparison is then made at step 64 between the calculated $k_{0,1}$'s for $T_H$ and $T_L$ and a match between these two calculated values is determined at step 66. If the two $k_{0,1}$ kinetic constants match as determined at step 66, a comparison is then made at step 70 between the calculated $r_2$'s for $T_H$ and $T_L$. If there is not a match between the two calculated $k_{0,1}$ kinetic constants, the activation energy $E_1$ is adjusted at step 68 and the three kinetic constants are then calculated for the $T_H$ and $T_L$ cases at steps 58 and 60, respectively. If the comparison between the calculated $r_2$ kinetic constants for $T_H$ and $T_L$ indicates a match as determined at step 72, a comparison is then made between the calculated $b_{0,1}$ kinetic constants for $T_H$ and $T_L$. If there is not a match between the calculated $r_2$ kinetic constants for $T_H$ and $T_L$, the activation energy $E_2$ is then adjusted at step 74, followed then by a recalculation of the three kinetic constants at both $T_H$ and $T_L$ at steps 58 and 60, respectively. If at step 78 it is determined that there is a match between the calculated blots at $T_H$ and $T_L$, Task B ends at step 82. If the calculated $b_{0,1}$ kinetic constants do not match, the $E_3$ activation energy is adjusted at step 80, followed by a recalculation of the three kinetic constants for the $T_H$ and $T_L$ cases at steps 58 and 60. This procedure continues until the two cases $T_H$ and $T_L$ provide the same set of $k_{0,1}$, $r_2$ and $b_{0,1}$ values.

Figure 4:
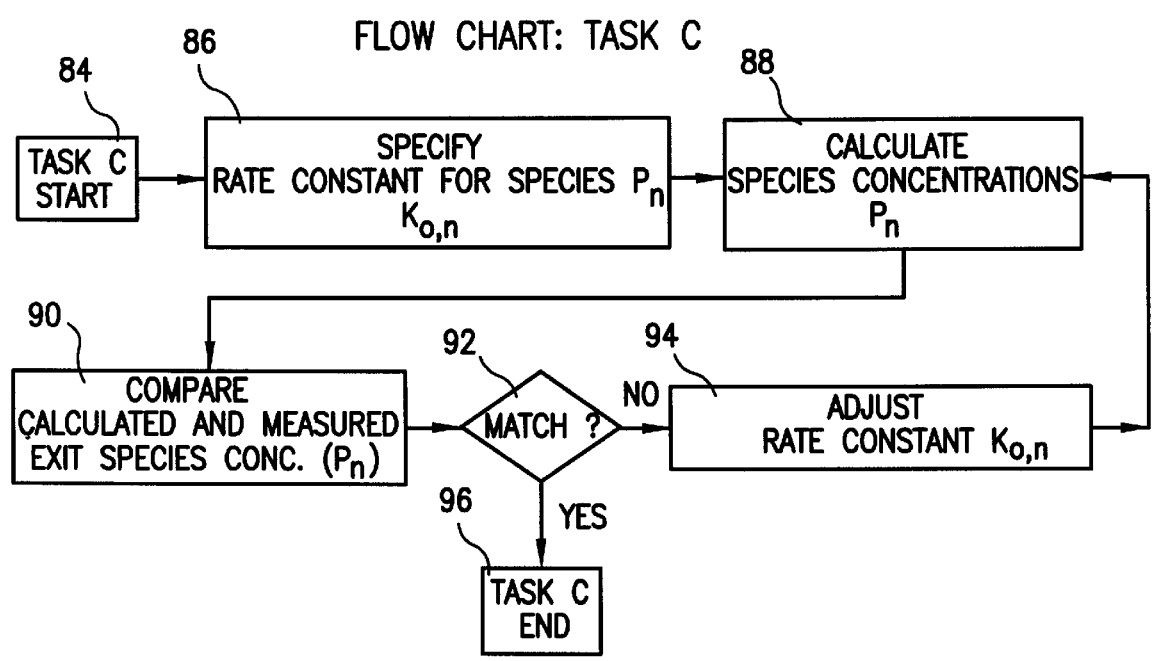
FIG. 4 is a simplified flow chart illustrating the steps involved in the iteration routine for calculating N-lump kinetic rate constants in accordance with the present invention.
Figure 5:
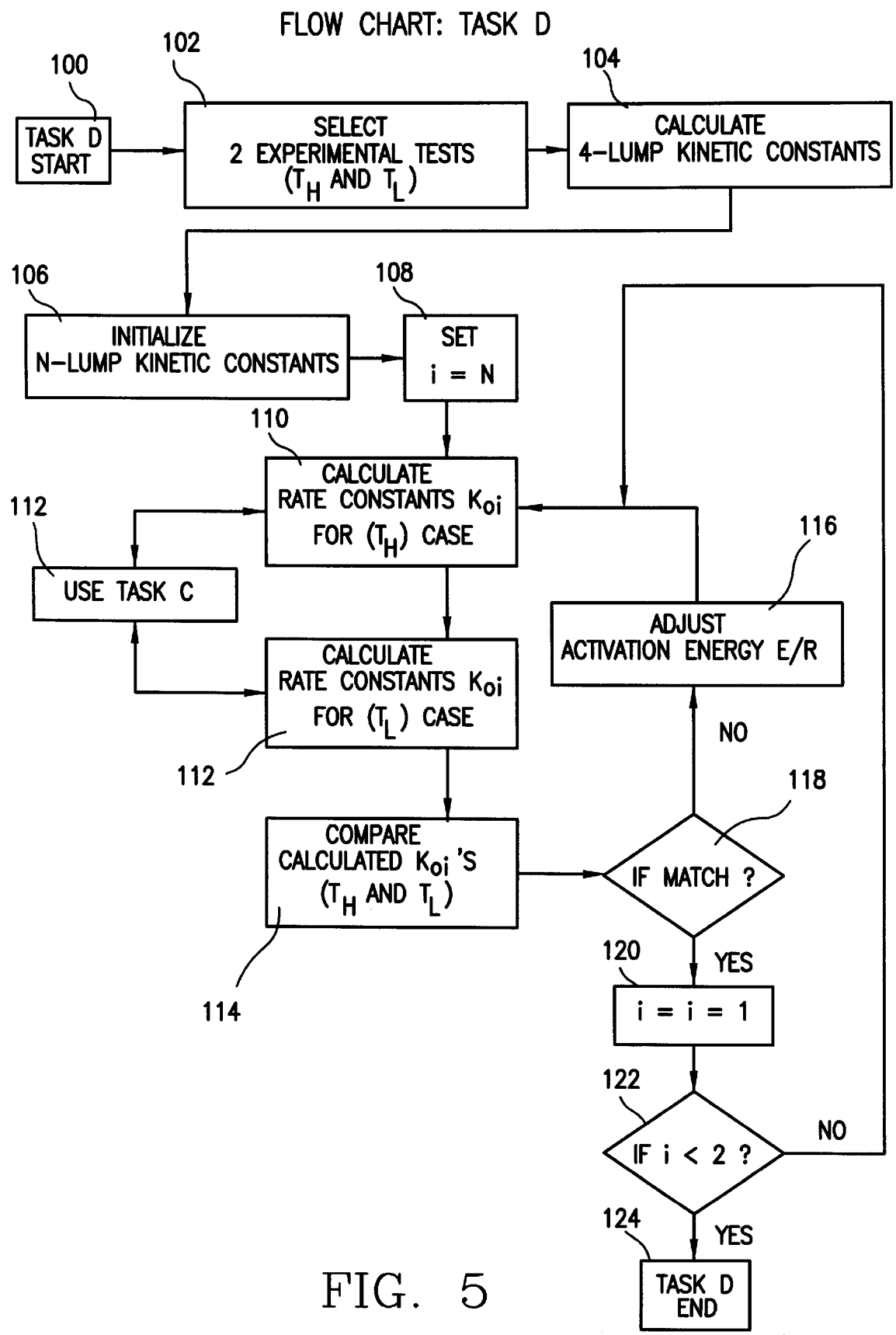
FIG. 5 is a simplified flow chart illustrating the steps involved in carrying out an iteration routine for calculating N-lump kinetic activation energies taking into consideration the effects of temperature in accordance with the present invention.
Figure 6:
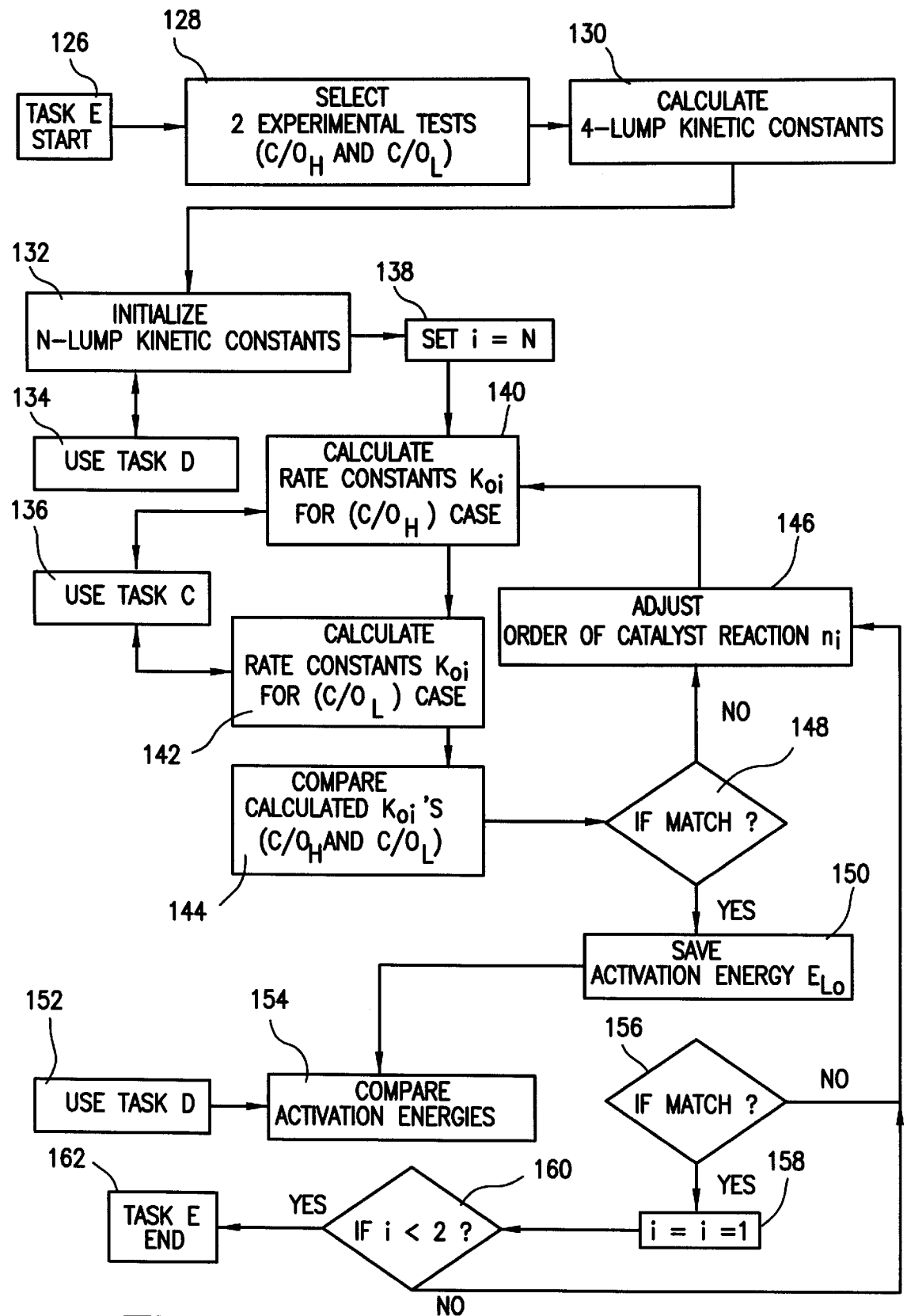
FIG. 6 is a simplified flow chart illustrating the steps involved in carrying out an iteration routine for calculating N-lump order of catalyst reaction $n_i$ including the effects of temperature in accordance with the present invention.
Figure 7:
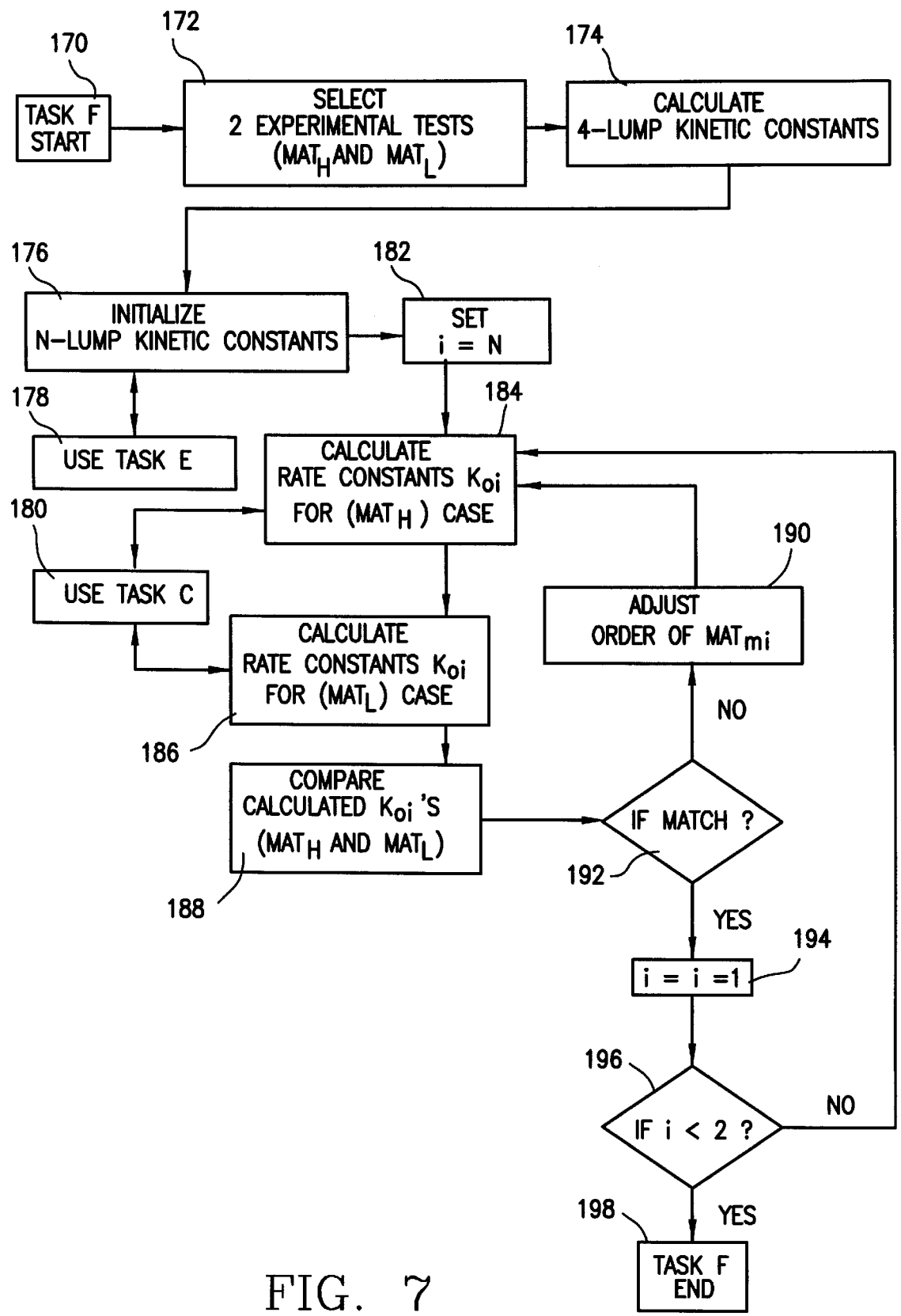
FIG. 7 is a simplified flow chart illustrating the steps involved in carrying out an iteration routine for calculating N-lump order of MAT $m_i$ including the effects of MAT, or the microactivity test for the catalyst in accordance with the present invention.

Four tasks are included in subspecies calculations. These tasks can be used for any number of subspecies. For a single experimental test case, the kinetic constant $k_{o,i}$ for each subspecies is determined by comparing calculated and measured exit species concentration $P_i$ in Task C as shown in FIG. 4. Task D as shown in FIG. 5 and Task F as shown in FIG. 7 are performed to include the effects of temperature and MAT, respectively. Their iteration routines are very similar. They start by selecting two experimental tests at two different conditions ($T_H$ and $T_L$ for Task D, or $MAT_H$ and $MAT_L$ for Task F). After determining 4-lump kinetic constants, a set of N-lump kinetic constants is initialized. The kinetic constants ($k_{o,i}$'s) for the lump N (i=N) are then calculated for the two cases by using Task C. These calculated $k_{o,i}$'s are compared and the activation energy, Ei, for Task D or the order of MAT, $m_i$, is adjusted until two cases give the same $k_{o,i}$. Then, the kinetic constants for the lump N−1, N−2, . . . , 2 are determined respectively using the same procedure. To include the effect of catalyst to oil ratio, Task E shown in FIG. 6 is initiated by selecting two experimental tests at two different C/O ratios, i.e., $C/O_H$ and $C/O_L$. After determining 4-lump kinetic constants, a set of N-lump kinetic constants is initialized using Task D. The kinetic constants ($k_{o,i}$'s) for the lump N (i=N) are calculated for the two cases by using Task C. These calculated $k_{o,i}$'s are compared and the order of catalyst reaction, $n_i$, is adjusted until two cases give the same $k_{o,i}$. The activation energy $E_i$ is then readjusted using Task D. The kinetic constants for the lump N−1, N−2, . . . 2 are determined respectively using the same procedure.

Task C shown in FIG. 4 is an iteration routine for the calculation of N-lump kinetic rate constants in accordance with another aspect of the present invention. Task C is initiated at step 84, followed by the specifying of the rate constant $k_{o,N}$ for species $P_N$. A calculation is then made at step 88 of the species concentrations $P_N$, followed by a comparison of calculated and measured exit species concentrations $P_N$ at step 90. If there is a match between the calculated and measured exit species concentrations $P_N$ as determined at step 92, Task C ends at step 96. If the calculated and measured exit species concentrations $P_N$ do not match as determined at step 92, rate constant $k_{o,n}$ is adjusted at step 94, followed by another calculation of the species concentrations $P_N$ until the two species concentrations match.

Task D shown in FIG. 5 is an iteration routine for calculating N-lump kinetic activation energies. Following initiation of Task D at step 100, two experimental tests are selected at step 102, one at a higher temperature $T_H$ and one at a lower temperature $T_L$. The 4-lump kinetic constants are then calculated for both temperatures at step 104, followed by initialization of the N-lump kinetic constants at step 106. Next, i is set equal to N for the N-lump case followed by calculation of the rate constants $k_{o,i}$'s for the $T_H$ case at step 110, followed further by the calculation of the constants $k_{o,i}$ for the $T_L$ case at step 112. Previously described Task C is used at steps 110 and 112 for calculating the rate constants $K_{o,i}$ for the $T_H$ and $T_L$ cases. At step 114, a comparison is made of the calculated $k_{o,i}$'s for the $T_H$ and $T_L$ cases. If there is no match of the calculated $k_{o,i}$'s at the higher and lower temperatures as determined at step 118, the activation energy $E_i/R$ is adjusted at step 116, followed by a recalculation of the rate constants $k_{o,i}$ for the $T_H$ and $T_L$ cases at steps 110 and 112. If at step 118 it is determined that there is a match between the $k_{o,i}$ values at the higher and lower temperatures, i is set equal to i−1 at step 120, followed by a comparison of i with the number 2 at step 122. If i is not less than 2 as determined at step 122, the rate constants $k_{o,i}$ are again recalculated for the higher and lower temperatures at steps 110 and 112. If at step 122 it is determined that i is less than 2, the iteration routine for calculating N-lump kinetic activation energies ends at step 124.

Referring to FIG. 6, there is shown a simplified flowchart of Task E for the iteration routine for calculating N-lump order of catalyst reaction $n_i$. Task E for calculating the N-lump order of catalyst reaction $n_i$ is initiated at step 126, followed by the selection of two experimental tests at two different C/O (catalyst to oil) ratios, $C/O_H$ and $C/O_L$ at step 128. At step 130, the 4-lump kinetic constants are calculated followed by initialization of the N-lump kinetic constants at step 132. At step 138, i is set equal to N, followed by calculation of the rate constants $k_{o,i}$ for the case $C/O_L$ at step 140. The rate constants $k_{o,i}$ for the other case of $C/O_H$ are then calculated at step 142. Task D previously described is used at step 134 in initializing the N-lump kinetic constants, while Task C is used at step 136 in the calculation of the rate constant $k_{o,i}$ for the two cases $C/O_H$ and $C/O_L$. The calculated $k_{o,i}$'s for $C/O_H$ and $C/O_L$ are then compared at step 144 to determine if there is a match of these two rate constants at step 148. If there is not a match of these two rate constants, the order of catalyst reaction $n_i$ is adjusted at step 146 followed by a recalculation of the rate constants $k_{o,i}$ for the two aforementioned cases at steps 140 and 142 until the two cases have the same $k_{o,i}$. If at step 5 148 it is determined that the calculated $k_{o,i}$'s match, the activation energy $E_{i,o}$ is saved at step 150 followed by a comparison of the activation energies at step 154. Previously described Task D is used in the comparison of the activation energies at step 152. If the compared activation energies do not match as determined in step 156, the order of catalyst reaction ni is again adjusted at step 146 followed by a recalculation of the rate constants for the two cases at steps 140 and 142. If at step 156 it is determined there is a match between the two activation energies, i is set equal to i−1 at step 158 and i is compared to the number 2 at step 160 and the process is repeated until the kinetic constants for the lump i−1, i−2, . . . 2 are determined respectively using the same procedure, with the task ending at step 162 following determination of the various kinetic constants.

Referring to FIG. 7 there is shown a flowchart for the iteration routine for calculating N-lump order of MAT $m_i$ which is initiated at step 170. At step 172, two experimental tests at $MAT_H$ and $MAT_L$ are selected, followed by calculation of 4-lump kinetic constants at step 174. N-lump kinetic constants are initialized at step 176 using Task E previously described at step 178. At step 182, i is set equal to N followed by calculation of the rate constants $k_{o,i}$ for the case of $MAT_H$ at step 184 and for the case of $MAT_L$ at step 186. Previously described Task C is used at step 180 for calculating the rate constants $k_{o,i}$ for the $MAT_H$ and $MAT_L$ cases. The calculated $k_{o,i}$'s for the $MAT_H$ and $MAT_L$ cases are then compared at step 188. If the comparison does not indicate a match between the calculated $k_{o,i}$'s for the two cases in step 192, the order of the MAT $m_i$ is adjusted at step 190 followed by a recalculation of the rate constants $k_{o,i}$ at steps 184 and 186. If at step 192 the calculated $k_{o,i}$'s are determined to match, i is then set equal to i-1 at step 194 and the kinetic constants for the lump N-1, N-2 . . . , 2 are determined respectively using the same procedure until i<2 as determined at step 196. Once a the kinetic constants for the lump N-1, N-2 . . . , 2 have been determined, Task F ends at step 198.

After one set of $k_{o,i}$'s, $E_i$'s, $n_i$'s and $m_i$'s are determined for all the species, they are validated by using them to predict other cases at different operating conditions.

Figure 8:
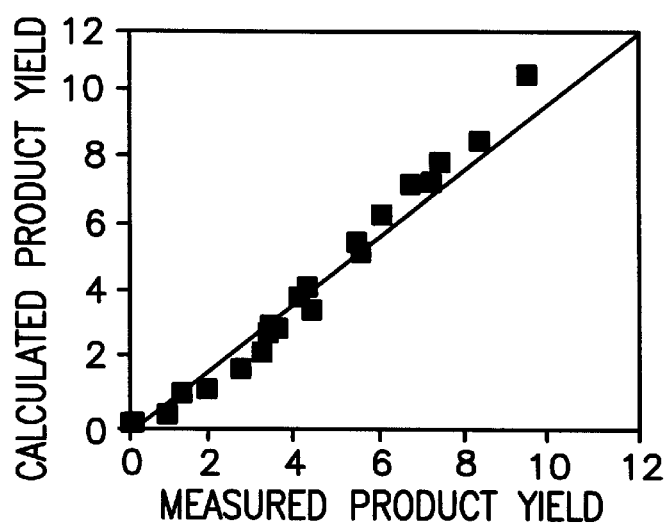
FIG. 8 is a graphic comparison of calculated product yields determined in accordance with the methodology of the present invention with measured experimental data for FCC riser product yields.

This methodology has been tested using the ICRKFLO 2.0 computer code. The measured product yields of an FCC riser reactor for two cases at different exit temperatures were selected and used in the iterative processes to determine a set of local kinetic rate constants and activation energies. Using the kinetic constants determined from the methodology, ICRKFLO 2.0 was used to calculate product yields at a variety of exit temperatures other than the two cases selected to incorporate local and global temperature effects into the kinetic constants. FIG. 8 illustrates a graphic comparison of calculated product yields from these computations with the experimental data. The comparison shows excellent agreement between calculated and experimental results.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A method for determining optimum local kinetic constants for a chemical flow reactor having a flow field for producing a product, said method comprising the steps of:

selecting experimental test data sets for various conditions including measured product yields for a plurality of products and flow conditions in the chemical flow reactor;

determining a calculated product yield of the chemical flow reactor for each of said products for selected test conditions using specified kinetic constants and flow conditions using coupled computational fluid dynamics and chemical kinetics for calculating product yields;

comparing said calculated product yields with said measured product yields and adjusting said flow conditions until said calculated product yields match said measured product yields; and comparing said calculated product yields with said measured product yields at said adjusted flow conditions and adjusting said kinetic constants until said calculated product yields match said measured product yields, wherein said adjusted kinetic constants incorporate the effects of coupled computational fluid dynamics and chemical kinetics.

2. The method of claim 1 wherein said chemical flow reactor comprises a fluidized catalytic cracking reactor for the processing of petroleum.

3. The method of claim 2 wherein said flow conditions include an exit temperature and an inlet catalyst temperature of the chemical flow reactor.

4. The method of claim 3 further comprising the step of adjusting the inlet catalytic temperature until the calculated and measured exit temperatures match.

5. The method of claim 4 wherein said measured and calculated product yields include exit feed oil concentration, exit light oil concentration, and exit dry gas concentration, and wherein said kinetic constants respectively include rate constants $k_{0,1}$, $r_o$ and $b_{0,1}$.

6. The method of claim 1 wherein the product yield is characterized by an operating temperature and an activation energy for each of said kinetic constants, said process further comprising the step of calculating first and second sets of kinetic constants using measured product yields at a first higher temperature and at a second lower temperature, comparing and again adjusting said first and second sets of kinetic constants until the product yields at said first higher and second lower temperatures match, wherein said second adjusted kinetic constants and activation energies incorporate the effects of coupled computational fluid dynamics and chemical kinetics.

7. The method of claim 1 wherein the product yield is characterized by a catalyst to oil ratio and an activation energy for each of said kinetic constants, said process further comprising the step of calculating first and second sets of kinetic constants using measured product yields at a first higher catalyst to oil ratio and at a second lower catalyst to oil ratio, comparing and again adjusting said first and second sets of kinetic constants until the product yields at said first higher and second lower catalyst to oil ratios match, wherein said second adjusted kinetic constants and activation energies incorporate the effects of coupled computational fluid dynamics and chemical kinetics.

8. The method of claim 1 wherein the product yield is characterized by a catalyst activity level and an activation energy for each of said kinetic constants, said process further comprising the step of calculating first and second sets of kinetic constants using measured product yields at a first higher catalyst activity level and at a second lower catalyst activity level, comparing and again adjusting said first and second sets of kinetic constants until the product yields at said first higher and second lower catalyst activity levels match, wherein said second adjusted kinetic constants and activation energies incorporate the effects of coupled computational fluid dynamics and chemical kinetics.

* * * * *

UNITED STATES PATENT AND TRADEMARK OFFICE
CERTIFICATE OF CORRECTION

PATENT NO. : 6,013,172
DATED : January 11, 2000
INVENTOR(S) : Shen-Lin Chang, et al.

It is certified that error appears in the above-identified patent and that said Letters Patent is hereby corrected as shown below:

| COLUMN | LINE | |
|---|---|---|
| 2 | 15 | "SMARY" should be --SUMMARY-- |
| 2 | 35 | "obtaining" should be --Obtaining-- |
| 4 | 34 | "$b1$" should be --$b_1$-- |
| 7 | 20 | "blots" should be --$b_{0,1}$'s- |
| 8 | 52 | "5148" should be --148-- |
| 8 | 58 | "ni" should be --$n_i$"-- |

Signed and Sealed this

Eighth Day of August, 2000

Attest:

Attesting Officer

Q. TODD DICKINSON

Director of Patents and Trademarks